(12) United States Patent
Bluhm

(10) Patent No.: US 8,122,994 B2
(45) Date of Patent: Feb. 28, 2012

(54) METHOD AND DEVICE FOR OPERATING A VEHICLE WITH A STEERING SYSTEM, AND A STEERING SYSTEM

(75) Inventor: Klaus-Juergen Bluhm, Steinbach (DE)

(73) Assignee: Continental Automotive GmbH, Hannover (DE)

( * ) Notice: Subject to any disclaimer, the term of this patent is extended or adjusted under 35 U.S.C. 154(b) by 273 days.

(21) Appl. No.: 12/477,676

(22) Filed: Jun. 3, 2009

(65) Prior Publication Data

US 2009/0294209 A1 Dec. 3, 2009

(30) Foreign Application Priority Data

Jun. 3, 2008 (DE) .................. 10 2008 026 612

(51) Int. Cl.
*B60R 25/02* (2006.01)

(52) U.S. Cl. ........................ 180/287; 180/433

(58) Field of Classification Search .................. 180/287, 180/443, 444, 446; 70/283.1, 185, 252; 307/10.2
See application file for complete search history.

(56) References Cited

U.S. PATENT DOCUMENTS

| | | | | |
|---|---|---|---|---|
| 5,454,238 A | * | 10/1995 | Ross et al. | 70/186 |
| 5,893,429 A | * | 4/1999 | Hackl et al. | 180/443 |
| 6,268,790 B1 | * | 7/2001 | Cregeur | 340/425.5 |
| 6,889,792 B1 | * | 5/2005 | Fardoun et al. | 180/287 |
| 7,127,921 B2 | * | 10/2006 | Kinme et al. | 70/252 |

FOREIGN PATENT DOCUMENTS

| | | |
|---|---|---|
| DE | 19641899 A1 | 11/1997 |
| DE | 19940323 A1 | 3/2001 |
| DE | 10392909 T5 | 7/2005 |
| DE | 102004020513 A1 | 11/2005 |
| DE | 102006045382 A1 | 4/2008 |
| DE | 102006056042 A1 | 5/2008 |
| EP | 1308355 A1 | 5/2003 |
| EP | 1308356 A1 | 5/2003 |
| FR | 2793749 A1 | 11/2000 |
| FR | 2831502 A1 | 5/2003 |

* cited by examiner

*Primary Examiner* — Anne Marie M Boehler
(74) *Attorney, Agent, or Firm* — Cozen O'Connor

(57) ABSTRACT

A steering system arranged in a vehicle having a steering wheel, a steering system control unit and a steering assistance unit with an electric motor. The steering system is designed to assist, by the motor of the steering assistance unit, a predefined steering movement of a driver at the steering wheel for steering steerable wheels of the vehicle and to steer the steerable wheels in accordance with the predefined steering movement. In this context, the steering wheel is mechanically coupled to the steering assistance unit. The steering system is also designed to block a predefined steering movement at the steering wheel, and therefore to block steering of the steerable wheels by the steering assistance unit, in a predefined state of rest of the vehicle.

15 Claims, 1 Drawing Sheet

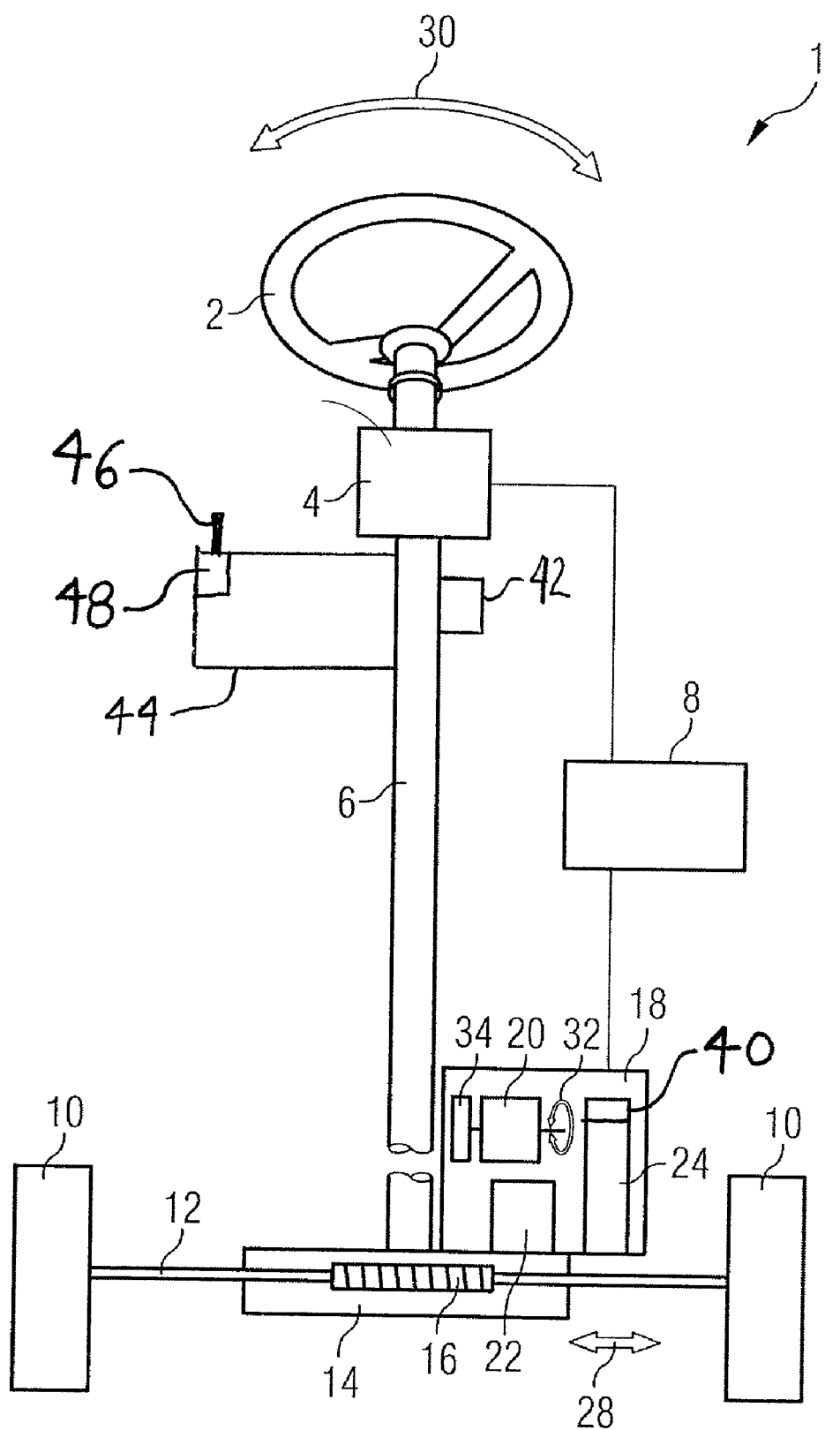

METHOD AND DEVICE FOR OPERATING A VEHICLE WITH A STEERING SYSTEM, AND A STEERING SYSTEM

BACKGROUND OF THE INVENTION

1. Field of the Invention

The invention relates to a steering system and a method for operating a vehicle with a steering system. The steering system comprises a steering wheel, a steering system control unit, and a steering assistance unit with a motor to assist a driver of the vehicle during a predefined steering movement at the steering wheel for steering steerable wheels of the vehicle.

2. Description of the Related Art

In a motor vehicle, a steering system, in particular an electric steering system, can increase the comfort for a driver of the motor vehicle during steering, for example by facilitating the steering movement of the driver during steering during the turning and/or the return travel of the steering wheel. For this purpose, the steering system first senses the steering movement of the driver and then assists the steering as a function of the sensed steering movement of the driver.

In modern motor vehicles, steering wheel locks are used which are transferred, for example by a locking bolt, from a released position into a position in which the steering system is blocked when an ignition key is withdrawn from an ignition lock of the motor vehicle. In this context, for example a device of a locking bolt is arranged directly under the steering wheel of the steering system in the driver's cab of the motor vehicle.

SUMMARY OF THE INVENTION

An object on which the invention is based is to specify a method and a device for operating a vehicle with a steering system, which particularly reliably blocks a steering movement at the steering wheel and steering of steerable wheels of a vehicle. In addition, an object of the invention is to specify a steering system, which is particularly simple and cost-effective.

According to one embodiment of the invention, a steering system is arranged in a vehicle and comprises a steering wheel, a steering system control unit and a steering assistance unit with an electric motor. The steering system is designed to assist, by the motor of the steering assistance unit, a predefined steering movement of a driver at the steering wheel for steering steerable wheels of the vehicle and to steer the steerable wheels in accordance with the predefined steering movement. The steering wheel is mechanically coupled to the steering assistance unit. The steering system is also designed to block a predefined steering movement at the steering wheel, and therefore to block steering of the steerable wheels by the steering assistance unit, in a predefined state of rest of the vehicle. The mechanical coupling is characterized in that, in the rest state of the vehicle, actuation of the steering assistance unit is sensed as a steering movement at the steering wheel, and conversely a steering movement at the steering wheel results in a motor rotational movement of the motor of the steering assistance unit. Since the steering wheel is mechanically coupled to the steering assistance unit, it is also particularly advantageous to use the steering assistance unit to block the steering movement at the steering wheel and the steering of the steerable wheels, particularly because as a result a particularly cost-effective and simple steering system is possible since the steering assistance unit which is already present is also used for blocking.

A separate steering wheel locking unit directly under the steering wheel is not necessary since the steering assistance unit is preferably installed in the engine compartment of the vehicle. This saves installation space under the steering wheel and increases the driver's safety in the event of an accident. In addition, the arrangement of the steering assistance unit in the engine compartment makes tampering with said unit in order to bypass the blocking of the steering virtually impossible.

Due to the blocking of the steering movement at the steering wheel and therefore the steering of the steerable wheels it is no longer possible for the driver to use customary steering forces at the steering wheel to carry out a steering movement at the steering wheel and therefore to steer the steerable wheels. The customary steering forces comprise here the steering forces which permit steering during travel of the motor vehicle, even, for example, when the steering assistance unit has failed.

A steering system of the motor vehicle, which can be activated only with steering forces which are greater than the customary steering forces, can therefore be referred to as blocked. In addition, the blocking can be understood as meaning that blocked steering of the motor vehicle typically makes travel with the motor vehicle impossible. Counteracting the steering movement at the steering wheel and the steering of the steerable wheels, for example by braking the steering movement and the steering, can therefore already be referred to as blocking of the steering movement at the steering wheel and the steering of the steerable wheels if steering forces which are greater than the customary steering forces have to be applied in order to bring about steering of the steerable wheels.

In one embodiment, the steering assistance unit comprises a steering blocking unit designed to block a motor rotational movement of the motor of the steering assistance unit in the state of rest of the vehicle. When the vehicle is not at rest, the motor assists the steering movement of the driver in a respectively predefined steering direction by the motor rotational movement. In the state of rest, the motor rotational movement is blocked by the steering blocking unit, so that a steering movement at the steering wheel and the steering of the steerable wheels is no longer possible or possible only with difficulty.

In one embodiment, the steering blocking unit blocks the motor rotational movement of the motor of the steering assistance unit in the state of rest of the vehicle by a locking bolt. The locking bolt is particularly suitable for ensuring mechanical blocking of the motor rotational movement in the state of rest of the vehicle, and therefore for blocking a steering movement at the steering wheel and the steering of the steerable wheels. For example, the locking bolt can block a motor shaft of the motor of the steering assistance unit.

In one embodiment, a brake, which is assigned to the motor and functionally coupled to the motor, blocks the rotational motor movement of the motor in the rest state of the vehicle. Owing to a transmission ratio of a transmission, by which the steering assistance unit is preferably mechanically coupled to the steering wheel, the driver senses the braking as blocking in the state of rest of the vehicle. The brake is embodied, for example, as a simple friction brake on the motor shaft of the motor. As a result, the brake permits safe and reliable blocking of the steering movement at the steering wheel and therefore of the steering of the steerable wheels in the rest state of the vehicle.

In one embodiment, the steering system control unit actuates the motor as a generator in the state of rest of the vehicle, specifically such that at least one phase winding of the motor is electrically short-circuited, and therefore an opposing torque, resulting from the generator mode of the motor, counteracts the motor rotational movement and blocks the predefined steering movement at the steering wheel and the steering of the steerable wheels. The steering system control unit is designed to actuate the steering assistance unit in the state in which the vehicle is not at rest, such that the steering movement at the steering wheel is assisted. Using the steering system control unit for actuating the steering assistance unit for blocking the steering even in the state of rest of the vehicle obviates the need for a separate control unit for a locking unit. Electrically short-circuiting the phase winding of the motor makes it possible to counteract the steering movement at the steering wheel and therefore the steering of the steerable wheels in a particularly easy way, since essentially no additional structural elements or components are required.

In a further embodiment, the steering system control unit actuates the motor of the steering assistance unit such that, in the state of rest of the vehicle, in the motor mode the motor counteracts, and therefore blocks, the predefined steering movement at the steering wheel. This in turn blocks the steering of the steerable wheels. In the state of rest of the vehicle, the motor in the motor mode counteracts the steering movement at the steering wheel. Conversely in the state in which the vehicle is not at rest, the motor assists the steering movement at the steering wheel. Actuating the motor in this way allows the steering movement, and therefore the steering of the steerable wheels, to be blocked particularly easily since essentially no additional structural elements or components are required.

In a further embodiment, the steering system control unit is designed, after occurrence of the state of rest of the vehicle and during nonactivation of the steering wheel, to enter or switch to a power economy mode and/or to interrupt actuation of the motor of the steering assistance unit. The power economy mode and/or the interruption of the actuation of the motor in the state of rest of the vehicle when the steering wheel is not activated permits particularly efficient operation of the steering system.

In a further embodiment, the steering system control unit detects a predefined steering movement at the steering wheel during the state of rest of the vehicle. Detecting a predefined steering movement at the steering wheel by the steering system control unit in the state of rest of the vehicle permits particularly safe and reliable operation of the steering system, in particular if a previously assumed power economy mode of the steering system control unit is exited and/or the motor is actuated such that blocking of the steering movement at the steering wheel and the steering of the steerable wheels is ensured.

In a further embodiment, the steering system control unit detects the state of rest of the vehicle. Detecting the state of rest by the steering system control unit permits actuation of the steering assistance unit to be carried out particularly reliably such that a steering movement at the steering wheel and the steering of the steerable wheels is blocked. Such an refinement of the steering system control unit obviates the need for a separate control unit which is designed to detect the state of rest.

In a further embodiment, the rest state of the vehicle is characterized in that an ignition system of the vehicle is switched off and/or an ignition key is withdrawn from an ignition lock of the vehicle and/or the vehicle is locked. In such a state of rest, the vehicle is in a state in which movement of the vehicle is to be prevented. This can be achieved particularly easily by blocking the steering movement at the steering wheel and therefore the steering of the steerable wheels.

In one embodiment of the invention a method and a corresponding device for operating a vehicle with a steering system which comprises a steering wheel and a steering assistance unit with an electric motor. The motor of the steering assistance unit assists a predefined steering movement of a driver at the steering wheel for steering steerable wheels of the vehicle in accordance with the predefined steering movement. The steering wheel is mechanically coupled to the steering assistance unit. In a predefined state of rest of the vehicle, the steering assistance unit is actuated such that a predefined steering movement at the steering wheel, and therefore steering of the steerable wheels, is blocked.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in more detail in the following text on the basis of the single schematic drawing, in which:

FIG. 1 is a schematic diagram of a steering system in a vehicle according to an embodiment of the present invention.

DETAILED DESCRIPTION OF THE PRESENTLY PREFERRED EMBODIMENTS

FIG. 1 illustrates a steering system 1 of a vehicle that comprises a steering wheel 2 which is mechanically coupled to a steering rod 6. The steering rod 6 is in addition mechanically coupled to a steering gear 14, which comprises a toothed rack 16. A track rod 12 is mechanically coupled to each of the two ends of the toothed rack 16, which track rods 12 are coupled to steerable wheels 10 of the vehicle. The steering gear 14 is designed to convert a rotational movement 30 at the steering wheel 2, which movement can also be referred to as a steering movement, into a linear movement 28 by the toothed rack 16, so that the steerable wheels 10 of the vehicle are steered in accordance with the steering movement 30 at the steering wheel 2.

The steering system 1 is preferably embodied as an electromechanical steering system and comprises a steering assistance unit 18, which, as illustrated in FIG. 1, is assigned to and mechanically coupled to the steering gear 14. Alternatively, the steering assistance unit 18 may be assigned to and mechanically coupled to the steering rod 6. The steering assistance unit 18 is therefore mechanically coupled to the steering wheel 2 by the toothed rack 16 of the steering gear 14 via the steering rod 6. The steering assistance unit 18 is preferably assigned to the engine compartment of the vehicle and is therefore particularly difficult to access in terms of tampering.

The steering assistance unit 18 is preferably embodied as an electric steering assistance unit 18 and comprises an electric motor 20, a steering assistance gear 22 and a steering blocking unit 24. The motor 20 is preferably embodied as a brushless synchronous machine and comprises a rotor with a permanent magnet. These components are preferably integrated in the housing of the steering assistance unit 18.

The steering assistance gear 22 is embodied, for example, as a recirculating-ball gear and is coupled by a plastic belt to an output gear wheel which is coupled to a motor shaft of the motor 20. The steering assistance gear 22, which is embodied as a recirculating-ball gear, is mechanically coupled to the toothed rack 16 such that the motor rotational movement 32 of the motor 20 is converted into the linear movement 28. Alternatively, other embodiments of the steering assistance gear 22 which are known to a person skilled in the art can also be used.

The steering system 1 also comprises a steering system control unit 8, which carries out, for example, a method for operating the vehicle and is preferably embodied as an electronic control unit of the vehicle. The steering system control unit 8 is preferably also designed to actuate the electric steering assistance unit 18. Such an embodiment of the steering system control unit 8 has the advantage that all the necessary data for actuating the steering assistance unit 18 is available by connecting the steering system control unit 8 to a data communication network of the vehicle. In this context, the steering system control unit 8 is also coupled to a steering torque sensor 4, which senses steering torque applied by a driver of the vehicle. During a driving mode of the vehicle, when the vehicle is unlocked and is therefore not in a state of rest, the electric steering assistance unit 18 is actuated by the steering system control unit 8 in response to the sensed steering torque to assist the steering movement 30 of the driver, so that the driver only then has to apply a small torque, i.e. customary steering forces at the steering wheel, to bring about steering of the steerable wheels 10. In addition to the steering torque sensor 4, signals from further sensors can also be taken into account in the actuation of the steering assistance unit 18 such as, for example, a sensed steering angle of a steering angle sensor.

In one embodiment, the steering blocking unit 24 is designed, in a predefined state of rest of the vehicle, to block the steering movement 30 of the driver and therefore the steering of the steerable wheels 10. The state of rest is characterized, for example, in that an ignition system 44 of the vehicle is switched off and/or an ignition key 46 is withdrawn from an ignition lock 48 of the vehicle and/or the vehicle is locked. The steering system control unit 8 is preferably designed to detect the state of rest of the vehicle and to actuate the steering blocking unit 24 as a function thereof. The steering blocking unit 24 can be embodied, for example, as an electrical actuator, for example as a lifting actuator, and can block the motor rotational movement 32 of the motor 20 by a locking bolt 40. For this purpose, for example the output gear wheel of the motor 20 is preferably embodied with at least one bore and the locking bolt is introduced into the at least one bore by the steering blocking unit 24 in the state of rest of the vehicle. Alternatively, the steering blocking unit 24 is designed to block the steering assistance gear 22 by the locking bolt 40. The steering assistance gear 22 is preferably embodied as a step down gear so that a reduced torque which results from the step down ratio at the output of the steering assistance gear 22 permits a particularly small embodiment of the locking bolt 40 and/or of the steering blocking unit 24 to be used.

In one embodiment, the motor 20 of the steering assistance unit 18 is functionally coupled to a brake 34, by the motor shaft of the motor 20. In this context, the brake 34 is embodied as a friction brake analogous to a drum brake or disk brake. However, other embodiments of the brake 34 which are known to a person skilled in the art can also be used.

The brake 34 is preferably actuated by the steering system control unit 8 and/or the steering blocking unit 24 such that when there is a predefined steering movement 30 in the state of rest of the vehicle the motor rotational movement 32 of the motor 20 is made more difficult or blocked, and the steering of the steerable wheels 10 is therefore made more difficult or blocked. The brake 34 is preferably actuated in a state in which the vehicle is not at rest such that the motor 20 of the steering assistance unit 18 actuated to assist the steering movement 30 of the driver.

In a further exemplary embodiment, the motor 20 is preferably actuated in the state of rest of the vehicle by the steering system control unit 8 such that at least one phase winding of the motor 20 is electrically short-circuited. When actuated in this way, the motor 20 is operated as a generator. The motor rotational movement 32 which results from the steering movement 30 at the steering wheel 2 produces an opposing torque which counteracts the motor rotational movement 32 and is greater the larger the steering deflections at the steering wheel 2 within predefined time periods. The opposing torque makes the steering of the steerable wheels particularly more difficult, that is to say blocks it, in particular if the motor 20 has a particularly high rated power.

In one embodiment, the motor 20 of the steering assistance unit 18 is operated in the motor mode in the state of rest of the vehicle. For this purpose, in the state of rest of the vehicle the motor 20 is actuated by the steering system control unit 8 such that it counteracts the steering movement 30 at the steering wheel 2, and therefore the steering of the steerable wheels 10. In this embodiment, in the state of rest of the vehicle, the motor 20 is not actuated to assist the steering of the steerable wheels, but rather to counteract the steering of the steerable wheels 10. The steering system control unit 8 is particularly designed to sense the current steering angle of the steering rod 6 and/or of the steerable wheels 10 at the time of state of rest of the vehicle, for example by a steering angle sensor 42, and to keep the sensed steering angle constant by actuating the motor 20 of the steering assistance unit 18. The motor 20 of the steering assistance unit 18 is typically of a correspondingly high power design so that such actuation in the state of rest of the vehicle can be referred to as blocking of the steering of the steerable wheels 10.

In one embodiment, the steering system control unit 8 is designed to predefine a power economy mode after the state of rest of the vehicle occurs if the steering wheel 2 is not activated. During nonactivation of the steering wheel 2 it is possible, for example, for actuation of the motor 20 to be interrupted and/or the steering system control unit 8 can assume a power economy mode. The steering system control unit 8 is preferably designed to detect, in particular in the power economy mode, a steering movement at the steering wheel 2 during the state of rest of the vehicle and to actuate the motor 20 of the steering assistance unit 18 as a function thereof, so that the steering movement 30 at the steering wheel 2 and the steering of the steerable wheels 10 is blocked.

It is also conceivable to combine the illustrated exemplary embodiments. For example, the actuation of the motor 20 of the steering assistance unit 18 in order to maintain the sensed steering angle can be combined with the use of the steering blocking unit 24. For this purpose, in addition to the actuation of the motor 20 of the steering assistance unit 18 it may also be preferred to monitor a voltage of an on-board power system of the vehicle and therefore a voltage of a battery of the vehicle. If, for example, the voltage of the battery drops below a predefined voltage value, it is possible, for example, to actuate the steering blocking unit 24 such that the predefined steering movement 30 at the steering wheel, and therefore the steering of the steerable wheels, is blocked in the state of rest.

The brake 34 and/or the steering blocking unit 24 are preferably embodied such that blocking of the steering movement 30 at the steering wheel 2, and therefore of the steering of the steerable wheels 10, is ensured even if the voltage of the on-board power system fails.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A steering system in a vehicle, comprising:
a steering wheel configured to control steerable wheels of the vehicle;
a steering assistance unit mechanically coupled to the steering wheel, the steering assistance unit comprising:
an electric motor configured to:
assist a first predefined steering movement of the steering wheel for steering steerable wheels and to steer the steerable wheels in accordance with the first predefined steering movement, and configured to
mechanically and electrically block a second predefined steering movement of the steering wheel in a predefined rest state of the vehicle; and
a steering system control unit coupled to the steering assistance unit,
wherein the steering system control unit is configured to actuate the motor in a generator mode in the rest state of the vehicle, wherein at least one phase winding of the motor is electrically short-circuited,
whereby opposing torque resulting from the generator mode of the motor counteracts the motor rotational movement.

2. The steering system according to claim 1, wherein the steering assistance unit further comprises a steering blocking unit configured to block a motor rotational movement of the motor in the rest state of the vehicle.

3. The steering system according to claim 2, wherein the steering blocking unit comprises a locking bolt configured to block the motor rotational movement of the motor in the rest state of the vehicle.

4. The steering system according to claim 2, wherein a brake is functionally coupled to the motor, the configured to block the motor rotational movement of the motor in the rest state of the vehicle.

5. The steering system according to claim 1, wherein the steering system control unit is configured to actuate the motor of the steering assistance unit such that, in the rest state of the vehicle, the motor blocks the first predefined steering movement,
whereby the steering of the steerable wheels is blocked.

6. The steering system according to claim 5, wherein the steering system control unit is configured to, after occurrence of the state of rest of the vehicle and during nonactivation of the steering wheel, to at least one of enter a power economy mode and to interrupt actuation of the motor of the steering assistance unit.

7. The steering system according to claim 1, wherein steering system control unit is configured to detect at least one of the first and the second predefined steering movements of the steering wheel during the rest state of the vehicle.

8. The steering system according to claim 1, wherein steering system control unit is configured to detect the rest state of the vehicle.

9. The steering system according to claim 1, wherein the rest state of the vehicle comprises one of:
an ignition system of the vehicle is switched off,
an ignition key is withdrawn from an ignition lock of the vehicle, and
the vehicle is locked.

10. A method for operating a vehicle with a steering system comprising:
assisting a predefined steering movement of a steering wheel by a steering assistance unit having an electric motor, the steering wheel being mechanically coupled to the steering assistance unit,
actuating the steering assistance in a predefined rest state of the vehicle such that the predefined steering movement of the steering wheel is mechanically and electrically blocked; and
actuating the steering system control unit the motor in a generator mode in the rest state of the vehicle, wherein at least one phase winding of the motor is electrically short-circuited,
whereby opposing torque resulting from the generator mode of the motor counteracts the motor rotational movement.

11. A device for operating a vehicle with a steering system, the steering system comprising:
a steering wheel;
a steering assistance unit mechanically coupled to the steering wheel, the steering assistance unit comprising:
an electric motor configured to assist a predefined steering movement of the steering wheel for steering steerable wheels of the vehicle,
wherein the device is configured to actuate the steering assistance unit in a predefined rest state of the vehicle such that the predefined steering movement of the steering wheel is mechanically and electrically blocked,
wherein the steering assistance unit is configured to actuate the motor in a generator mode in the rest state of the vehicle, wherein at least one phase winding of the motor is electrically short-circuited,
whereby opposing torque resulting from the generator mode of the motor counteracts the motor rotational movement.

12. The steering system according to claim 1, wherein the first predefined steering movement and the second predefined steering movement are one of the same and different.

13. The steering system according to claim 1, further comprising a steering torque sensor configured to sense steering torque applied by a driver of the vehicle.

14. The steering system according to claim 4, wherein the steering assistance unit is actuated by the steering system control unit based at least in part on the sensed steering torque.

15. The steering system according to claim 1, wherein the mechanical block is at least one of a bolt and a friction brake.

* * * * *